United States Patent [19]

Dumas

[11] 3,818,305

[45] June 18, 1974

[54] APPARATUS AND CIRCUIT FOR PROVIDING VOLTAGE TO FOCUS ANODE

[75] Inventor: Christ J. Dumas, Forest View, Ill.

[73] Assignee: American Plasticraft Company, Chicago, Ill.

[22] Filed: Oct. 2, 1972

[21] Appl. No.: 294,285

[52] U.S. Cl. .......... 321/2, 321/15

[51] Int. Cl. .......... H02m 3/22

[58] Field of Search .......... 321/15, 2 HF

[56] References Cited

UNITED STATES PATENTS

| | | | |
|---|---|---|---|
| 2,157,534 | 5/1939 | George et al. | 321/15 X |
| 2,513,225 | 6/1950 | Wright | 321/2 HF |
| 2,744,229 | 5/1956 | Rea | 321/15 |
| 2,783,413 | 2/1957 | Smith | 321/15 X |
| 3,412,311 | 11/1968 | Siedband | 321/15 X |
| 3,723,850 | 3/1973 | Daniels et al. | 321/15 X |

*Primary Examiner*—William M. Shoop, Jr.

[57] ABSTRACT

This invention refers to an improved assembly providing a voltage to the focus anode of a cathode ray tube wherein susceptibly of arc damage to the associated electronic circuitry is minimized by providing means for dissipating the arcing energy and wherein full tracking of the focus anode voltage with the high voltage supply is obtained.

5 Claims, 14 Drawing Figures

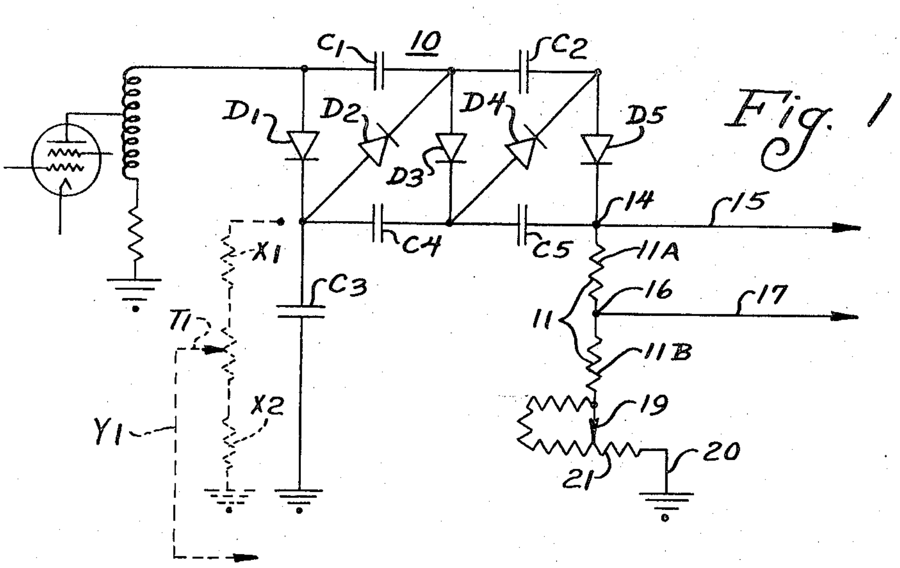
Fig. 1
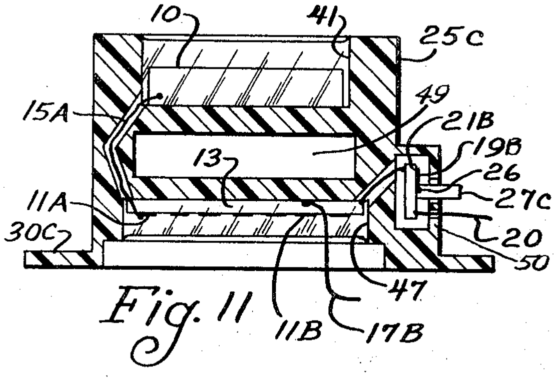
Fig. 11
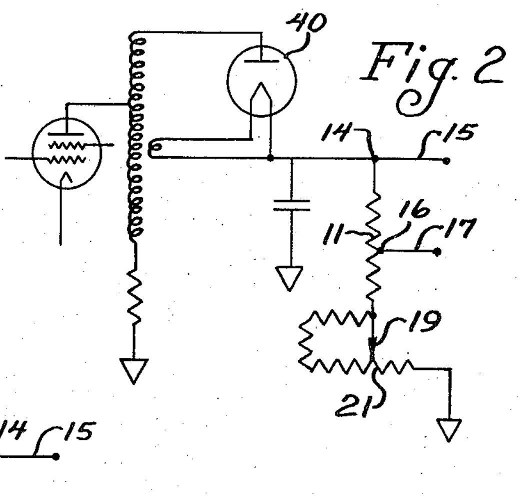
Fig. 2
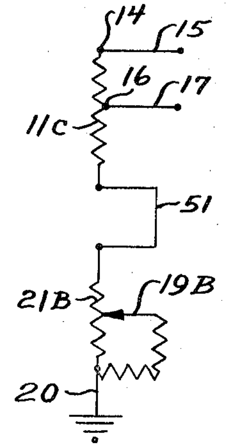
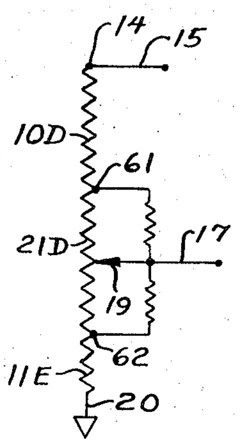
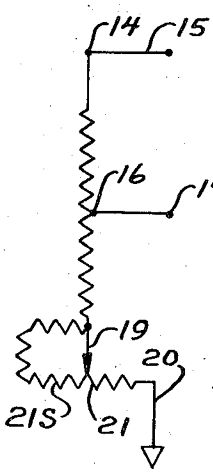
Fig. 3
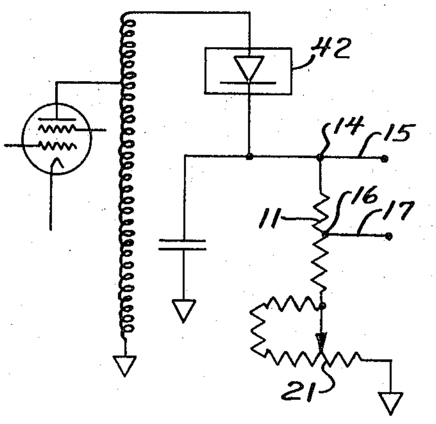
Fig. 12 Fig. 13 Fig. 14

APPARATUS AND CIRCUIT FOR PROVIDING VOLTAGE TO FOCUS ANODE

BACKGROUND OF THE INVENTION

The prior art discloses a number of circuits and apparatus for providing the voltage to the focus anode of a cathode ray tube used as a television picture tube.

Such prior art circuits include the voltage multiplier assemblies, comprising a matrix of capacitors and diodes, as for example, shown in FIG. 1. Other types of circuits are known for providing the focus anode voltage including filament type tube rectifiers and solid state rectifiers. However, it has been found that such prior art circuits are susceptible to damage from arcing voltages which can damage the diodes in the associated high voltage multiplier assembly; for example, the focus anode voltage is taken from a tap on the resistor connected to the variable resistor on the input side of the multiplier assembly. An arcing event can also damage the high power rectifiers whether it be filament type tube or whether it be a solid state type rectifier. In the case of the solid state rectifier circuit, it can cause a rectifier to go into uncontrolled oscillation at some frequency by the associated circuit components.

Further, such prior art devices may not provide full tracking with the high voltage supply due to for example, component variations in the matrix assembly. More specifically, as the high anode voltage varies, the focus voltage may not track or vary proportionally as the high voltage supply.

In the present invention, a resistor, having a stationary intermediate tap is, in effect, connected to a resistor having a variable tap to provide an adjustable focusing onctrol. The high voltage supply is provided across both resistors and the focus anode voltage is obtained from the stationary tap. The resistors are connected to provide a high current path such that when an arc occurs, the high current or high voltage energy will flow-through the resistors and be shunted; or by-passed around the associated electronic devices to clear the occluded or shorted connection in the cathode ray tube thereby dissipating the arc energy to protect the cathode ray tube and the associated electronic circuits from any damage.

DESCRIPTION OF THE DRAWINGS

FIG. 1 shows a schematic circuitry of a matrix network comprising a multiplier assembly; and, the resistance elements connected to provide a focus voltage;

FIG. 2 shows a filament type rectifier for providing the focus voltage;

FIG. 3 shows a solid state rectifier for providing the focus voltage;

FIG. 11 is a view in cross section of a housing showing the mounting of a multiplier assembly and an adjustable resistor wherein the adjustable portion is formed and mounted separately from the variable portion of the resistor;

FIG. 12 shows the electrical representation of the resistor structure of FIG. 11;

FIG. 13 shows an electrical representation of the resistor structure of FIG. 10; and, FIG. 14 is an electrical representation showing the current flow-through to an adjustable resistor to explain the operation of the circuit of FIG. 4.

DESCRIPTION OF THE INVENTION

Figures 4, 5, 6, 7, 8, 9, 10:
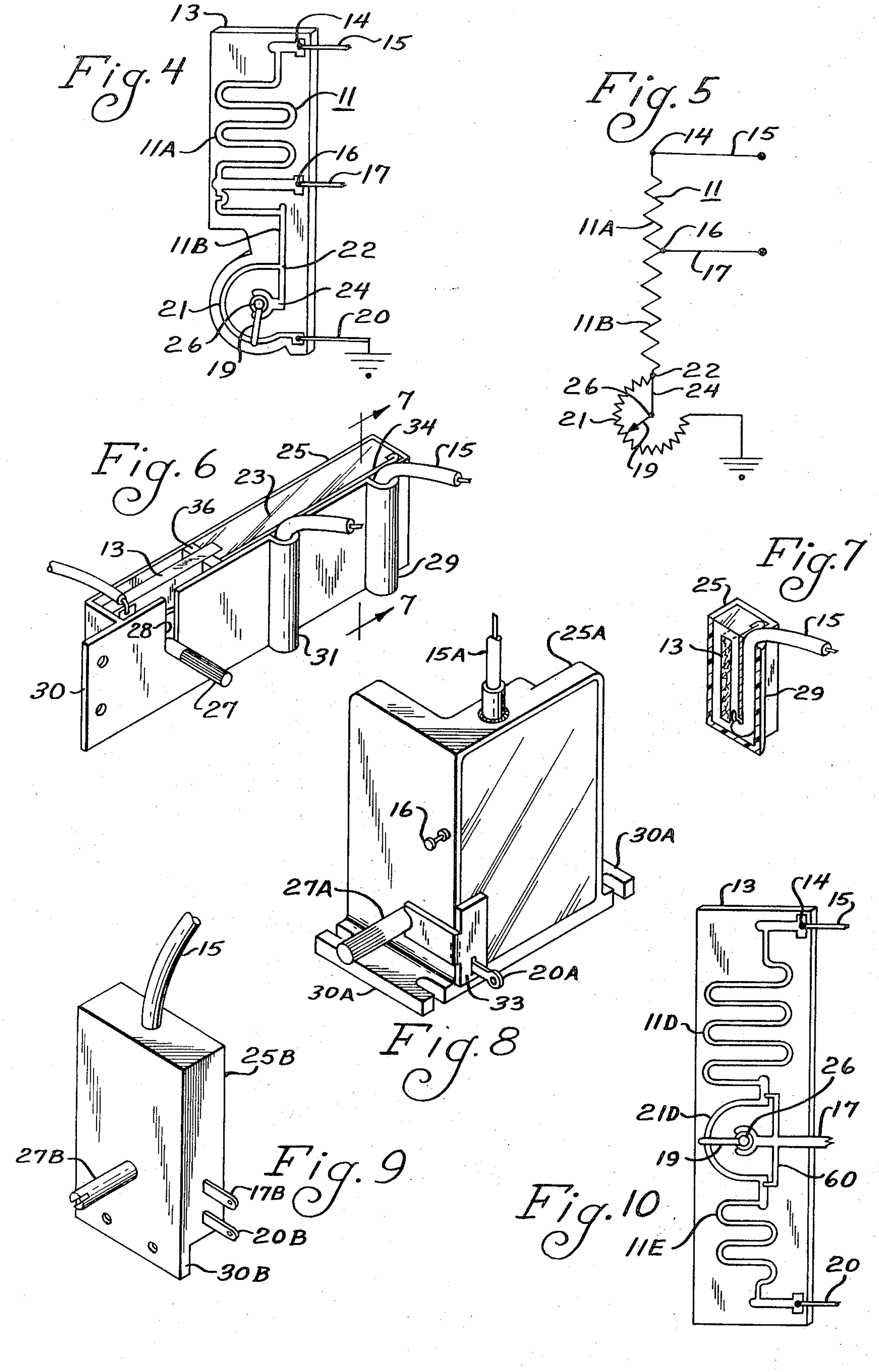
FIG. 4 shows a ceramic substrate on which a resistor is formed and includes an adjustable tap control for adjusting the focus voltage provided.
FIG. 5 shows an electrical representation of the structure of FIG. 4.
FIG. 6 shows the housing for structure of FIG. 4 wherein the structure of FIG. 1 is mounted in the housing which is suitable for mounting in operating position in a television picture tube.
FIG. 7 is a view partially in cross section taken along the lines of 7—7 of FIG. 6.
FIG. 8 shows another embodiment of a housing for mounting a structure such as shown in FIG. 4.
FIG. 9 shows a third embodiment of the invention for mounting the structure such as shown in FIG. 4.
FIG. 10 shows a ceramic substrate on which a resistor is formed including an adjustable tap control and shunt or bypassing resistor connected in parallel with the entire tap control.

Refer now to FIG. 1. Matrix assembly or lattice network 10 of FIG. 1 functions in a conventional manner as a voltage multiplier to develop a high voltage on input lead 15.

FIG. 1 also indicates prior art circuitry by the dotted representation of the series resistors X1 and X2 and conductive lead Y1. One terminal of resistors X1 and X2 connects to the junction of diode D1 and capacitor C3 and the other terminal connects to ground reference. A movable tap T1 connects to resistors X1 and X2 to lead Y1 to provide a voltage to the focus anode. In such a prior art configuration, any arcing voltage occuring on the anode or high voltage lead 15 may arc back through matrix assembly 10 (and thence through resistors X1 and X2 to ground) and may thus damage the diodes D1–D5 in the matrix assembly.

Also in such prior art devices, the focus anode voltage may not provide full tracking due to the DC component of voltage in the matrix assembly 10.

In contrast to the prior art, the inventive circuitry provides series resistors 11A and 11B (generally labeled 11) and 21 connected on the output or high voltage side of the matrix assembly 10. More specifically, the high voltage lead 15 develops a voltage across resistors 11A and 11B and 21 to ground reference on the output side of the matrix assembly 10. Note also that the high DC voltage developing circuit could also comprise a filament type rectifier as shown in FIG. 2 or a semi-conductor amplifier as shown in FIG. 3.

Resistors 11A, 11B and 21 are connected through the movable tap 19 and a portion of resistor 22 to ground reference. A stationary tap 16 on resistors 11A and 11B couples a voltage through lead 17 to the focus anode. In the inventive circuit, the focus voltage is directly related to the high voltage develped across lead 15 since it is obtained across the same resistors, and thus provides the advantages of full tracking of the anode voltage; such that as the high voltage on lead varies, the focus voltage on lead 17 varies proportionally therewith.

An important advantage of the circuit of FIG. 1 is that in the event of arcing, the arcing energy causes a large current to flow-through resistors 11A, 11B and 21 to absorb the arcing energy, and this large current clears the arc source in the television picture tube. The high current caused by the arcing is thus shunted or bypassed around matrix assembly 10 to thereby avoid damaging the components in the matrix assembly.

Referring to FIG. 4, the resistor generally labeled 11 is formed as a thick carbonaceous film in serpentine configuration on a ceramic substrate 13. The resistor 11 has a high voltage terminal 14 at the upper end (as oriented in FIG. 1) of resistor 11, and a focus voltage terminal 16 at an intermediate point on the resistor 11. Conductive leads 15 and 17 electrically connect to terminals 14 and 16 respectively. The lower portion 11B of resistor 11 extends downwardly on the substrate 13 to a point 22 where the film divides into two paths, one path being a semi-circular portion 21, which terminates at the lower edge of substrate 13 as a reference potential terminal 18 connecting through lead 20 to ground. The other path 24 from point 22 extends toward the center of the semi-circular portion 21 where it makes electrical connection with the pivoting or rotating pin 26 of a rotatable and conductive arm 19. Arm 19 extends from the pivot point 26 and its free end abuts against, and makes electrical contact, with the film portion 21.

Arm 19 provides a manually adjustable electrical tap for the resistor 11. Briefly, referring to FIG. 6, a knob 27 is affixed to pin 26 to enable arm 19 to be positionally adjusted.

The electrical equivalent of the circuit of FIG. 4 is shown in FIG. 5 wherein the like reference characters refer to the same elements as in FIG. 4.

It will be readily appreciated that the movable tap 19 provides a means for varying the resistance provided by semi-circular portion 21 to the total resistance of resistor 11. Accordingly, with a voltage couples to lead 15, the voltage output on focus anode 17 will depend on the setting of tap 19.

Note also that semi-circular portion 21 provides a fixed or constant connection from ground through the entire semi-circular portion 21 to resistor 11. Provision of such a fixed resistance connection tends to eliminate arcing and corona discharge. it has been found that a connection to resistor 11 is made only through movable arm 19, arcing and corona discharge occur due to the less than perfect connection between movable arm 19 and portion 21. This may be due to micromovement of the arm 19 due to contact bounce or heating and cooling of arm 19, to be disussed further hereinbelow.

Contact bounce between tap 19 and resistor 21 may produce minnows in the picture tube; that is, spotting, horizontal streaks or white grass modulation.

FIG. 6 shows an assembly of substrate 13 and the included resistor 11 mounted in a housing 25. Housing 25 may be formed of any suitable plastic in the form of a rectangular U-shaped box that includes mounting flange 30. As in FIG. 5, like reference characters in FIG. 6 refer to the same elements in FIG. 4.

A slot 28 on the side of housing 25 accomodates pin 26 and manually rotatable knob 27 mounted on pin 26, as mentioned above.

A pair of protrusions in the shape of sleeves 29 and 31 are formed on the side of housing 25 to accomodate respective leads 15 and 17. The bottom end of each of sleeves 29 and 31 is closed and the upper end is open. FIG. 7 is a cross sectional view taken along the lines 7—7 of FIG. 6, and more clearly shows the construction of sleeve 29 (sleeve 31 is identical to sleeve 29) and the positioning of the lead 15 in sleeve 29. The tortuous path shown in FIG. 7 for lead 15, separated from the potting compound by the mechanical and dielectric barrier wall 34, provides a larger dielectric means path to ground with its attendant advantage of higher corona discharge start characteristics.

In assembly, the substrate 13 and the included resistor 11 with the associated leads 15, 17, 20 and pin 26 with knob 27 are placed in housing 25. A flat plate 34 is positioned adjacent the wall on which sleeves 29 and 31 are formed, and a wedge or clinch seal 36 is placed across the housing to separate the semi-circular portion 21 from the upper portions 11A and 11B of resistor 11.

As shown in FIG. 6, the housing 25 is open on its top side for receiving an encapsulation or potting compound 23. That section of the housing 25 between the seal 36 and the right hand end, as oriented in FIG. 6 is filled or pottedn with the encapsulation compound 23. Substrate 13 will thus be held firmly in position in housing 25 and leads 15 and 17 will be secured by plate 34 in position in their respective sleeves 29 and 31.

The end of housing 25 between clinch seal 36 and the left hand end thereof, wherein the portion of substrate 13 carrying the semi-circular portion 21 and the rotatable arm 19 is positioned, is not filled with encapsulating compound 23 to thus permit arm 19 to be positionably adjustable by knob 27 and pin 26.

The structure of FIG. 6 enables the stationary tap 17 and the movable tap 21 connections to resistors 11A and 11B and 21 to be made internally in an associated housing 25. No connections to the resistors themselves need be made when the structure is connected to the picture tube which thereby eliminates the possibility of faulty connections.

Another embodiment of the invention is shown in FIG. 8 wherein an L-shaped housing 25A is provided for receiving the ceramic substrate 13. The mounting brackets, generally labeled 30A for mounting the housing 25 extend from the bottom of the housing. The ceramic substrate 13 with the included thick film resistor 11 is mounted on the one side (the left hand side as oriented in FIG. 8) of the L-shaped housing 25A. A matrix assembly (see FIG. 1) is mounted on the right or open side of housing 25A. Note that leads 15A, terminal 16A and terminal 20A correspond to lead 15, terminal 17 and terminal 20 in FIG. 4, respectively. The focus anode tap 17A extends through a suitable aperture on the left side of the housing and the high voltage lead 15A extends outwardly from the top of the housing 25A. The movable knob 27A similar in function to knob 27, extends outwardly from the left hand side of the housing 25A. The left hand side of housing 25A includes a slot, not shown, but similar to slot 28 in housing 25 of FIG. 6 to accomodate knob 27A.

A bracket and shield, extending over the reference voltage terminal 20A and adjacent knob 27A, separates the encapsulating compound 23, the resistor portion 21 and the rotatable arm 19 similarly as does bulkhead 26 in FIG. 6. The outward portion of bracket 33 extends semi-circumferentially around knob 27A to provide a hearing surface of the knob. The structure of FIG. 8 is essentially similar to the structure of FIG. 6; that is, the substrate 13 and the resistor 11 are mounted in housing 25A, and likewise the matrix assembly 10 is mounted in housing 27A and the components are then potted in position.

Another embodiment of the invention is shown in FIG. 9 wherein the entire assembly shown in FIG. 1 is positioned in a housing 25B, which is rectangular in shape and is open in the back (opposite the viewer). The substrate 13 and the included resistor 11 are placed in the housing 25B and then the assembly is encapsulated in a suitable compound similarly as the structure of FIGS. 4 and 6. Housing 25B includes a suitable mounting bracket 30B; a movable knob 27B similar in function to knob 27, extends through a suitable hole or aperture in the left side (as oriented in FIG. 9) of the housing 25B.

The ground terminal 20B and the focus terminal 17B extend outwardly from the right side of the housing through appropriate apertures, and the high voltage lead 15 extends outwardly from the top of the housing.

The embodiment of FIG. 10 provides a variation of the structure of FIG. 4 wherein the resistor element labeled as series connected portions 11D, 21D and 11E provide a resistor similar in function to that shown in FIG. 4. Note however, that in this embodiment, the variable portion 21D is connected directly in series with resistors 11D and 11E and the free end of movable arm or tap 19 rides on resistor 21D while the pivot end 26 of tap 19 connects directly to lead 17 to provide a voltage on lead 17 dependent on the setting of tap 19.

Resistor portions 21D and 11E are formed similarly as the apparatus of FIG. 4. In addition thereto, a separately screened film 60 of relatively much higher resistance is connected in parallel with resistor portion 21D. A mid point on resistor 60 is electrically connected to the pivot point of movable tap 19.

FIG. 13 shows an electrical representation of the apparatus of FIG. 10 wherein the movable contact 19 is varied from an upper stop 61 on resistive portion 21D to a lower stop 62. In operation, the shunt or parallel connected resistor 60 functions in the same manner, and can be packaged, as the apparatus of FIG. 4 to provide an arc suppressing means. As mentioned, in manufacture, film 60 may require secondary screening and firing to provide a relatively higher resistance unit per length than resistors 11 and 21.

As is obvious, the voltage on lead 17 is dependent on the setting of adjustable tap 19; or, in other words, adjustment of tap 19 permits adjustment of the voltage appearing at terminal 16 connecting to lead 17. Note, that in addition to permanent electrical connection from ground through resistor 21 to electrical point 22 and resistor 11, for purposes to be described.

FIG. 11 is a view partly in cross seciton of a structure utilizing the concept of the invention wherein the adjustable tap resistor and the stationary tap resistor are physically separate components. The housing 25C of FIG. 10 comprises a rectangular shaped box having an open recess 41 on the top (as oriented in FIG. 11) and a similar open recess at the bottom 47. Housing 25C includes suitable mounting flanges 30C.

A sub-assembly comprising a voltage multiplier or matrix assembly 10, including capacitors and diodes as indicated in FIG. 1 can be mounted in recess 41 and encapsulated therein by a suitable compound 23. Likewise, the substrate 13 including resistor 11A and 11B similar to the components in FIG. 4 is positioned in recess 47 and then encapsulated therein by a suitable compound 23.

An air space or opening 49 is formed interiortly of housing 25C and extends from the front to the back as oriented in FIG. 10 of the housing. Air space 49 forms an air dielectric barrier and separates the matrix assembly from the ceramic substrate 13 and resistors 11A and 11B. A suitable lead 15A connects from the resistors 11A and 11B to the matrix assembly 10. Air space 49 not only provides a dielectric barrier but also provides a thermal insulation, or isolation, between matrix assembly 10 and the resistors 11A and 11B formed on substrate 13.

In the embodiment of FIG. 11, the resistor portion 21B is formed as a separate unit. Housing 25C includes a separate discrete compartment 50 which forms a housing for resistor portion 21B. Resistor 21B is similar in function structure to the portion 21 shown in FIG. 4 and includes a rotatable pin 26 affixed to knob 27C to rotate the movable arm 19 on the resistor portion 21B. Terminal point 22B, on resistor portion 21, similar to point 22 in FIG. 4, is connected through a suitable conductive lead 51 to one terminal of resistor 11. A focusing anode lead 17B and a high voltage lead, not shown, is connected to resistor 11 similarly as leads 17 and 15 in FIG. 4.

Note also that the housing of FIG. 7 can accomodate a single unit resistor element as in FIG. 4, or a separate resistor element as indicated in FIG. 10.

FIG. 12 is an electrical representation of the structure of FIG. 10 and essentially comprises a variable resistor 21B having one terminal connected through lead 20 to ground reference, a movable tap 19B, and its other terminal connected through a conductive lead 51 to a separate and distinct resistor 11C. Resistor 11C has a stationary focus tap 16; and, lead 17B and a high voltage terminal 14 and lead 15B are connected thereto. The operation of the circuit of FIG. 11 is similar to that of FIG. 4.

FIG. 14 shows an electrical circuit useful in explaining the operation of the circuit. As depicted in FIG. 14, the current, indicated as "*i*," normally flows upwardly through the right hand side of resistor portion 21 and tap 19; and, thence through resistor 11.

Note that there is also always an electrical connection from ground reference through the entire length of resistor portion 21 to point 22 independently of the particular setting of tap 19. The foregoing compensates for a micromovement of tap 19 caused by variations in the ambient heat, and any uneveness, roughness or irregularity in the physical contact between tap 19 and resistor 21. This tends to provide a clear picture on the cathode ray tube with no horizontal streaks, spotting, or white grass modulation.

In other words, should there be any improper contact between the movable adjustable tap 19 and resistor 21 due to, for example, wear, pitting, oxidation, aging, etc; or should there be any micromovement of tap 19, due for example, to changes in ambient temperature, that portion of resistor 21 between tap 19 and terminal point 22, indicated as 21S or shunt, in FIG. 14, will function as a low level arc suppressor.

By providing such arc suppressing function across, or in parallel with tap 19, the arcing voltage peaks are dampened, or suppressed which tends to reduce electrical noise and thus provide a clear picture with no horizontal streaks, spotting, or white grass modulation.

As mentioned above, the inventive apparatus has advantages of providing full tracking of the high voltage supply by the focus anode; and, also provides a protective resistive path which shunts the high voltage electronic circuit in the event of arcing.

While the invention has been particularly shown and described with reference to preferred embodiments, it will be understood by those skilled in the art that various changes in form details may be made therein without departing from the spirit and scope of the invention.

What is claimed is:

1. An apparatus for providing a voltage to focus anode of a cathode ray tube, comprising, in combination, a voltage multiplier assembly for receiving an a.c. voltage and providing a high d.c. voltage output, a resistance element connected to the output side of said multiplier assembly, a first terminal on said resistance element connecting a high voltage therefrom, and an electrical connection connecting to an intermediate point on said resistance element for coupling the voltage appearing thereacross as the focus anode voltage whereby tracking of the focus anode with the d.c. voltage is obtained, said electrical connection comprising a rotatable, relatively low resistance arm, the movable end of said arm electrically contacting said resistance element, the pivot point of said arm coupling electrically to the focus anode, and a separate portion of said resistance element being connected electrically in parallel with said arm as a relative constant and continous high resistance electrical path to provide voltage dampening and suppression whereby electrical noise is minimized to prevent horizontal streaks, spotting and such on the cathode ray tube.

2. An apparatus as in claim 1 further including a housing for said resistance element, said resistance element including a fixed resistance portion and a variable resistance portion; said housing being divided into sections, one section housing the fixed resistance portion and the other section housing the variable resistance, and means for encapsulating the fixed resistance portion.

3. An apparatus as in claim 1 wherein said resistance element comprises a first fixed resistance portion and a separate variable resistance portion, said fixed resistance portion being connected to said variable resistance portion through suitable leads, said housing having separate compartments for housing said fixed resistance portion and variable resistance portion separately one from the other, said housing including an air dielectric for housing said fixed resistance portion in spaced position from the matrix assembly to thereby provide dielectric and thermal insulation between said fixed resistance portion and said multiplier assembly.

4. An apparatus as in claim 1 wherein said variable resistance element comprises a movable arm connected in parallel with a fixed resistance portion.

5. An apparatus as in claim 1 wherein said resistance element comprises a resistance film formed on a ceramic base.

* * * * *